(12) United States Patent
Hendry et al.

(10) Patent No.: US 9,128,849 B2
(45) Date of Patent: Sep. 8, 2015

(54) COHERENT MEMORY SCHEME FOR HETEROGENEOUS PROCESSORS

(75) Inventors: Ian Hendry, San Jose, CA (US); Rajabali Koduri, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 772 days.

(21) Appl. No.: 13/082,139

(22) Filed: Apr. 7, 2011

(65) Prior Publication Data

US 2011/0252200 A1    Oct. 13, 2011

Related U.S. Application Data

(60) Provisional application No. 61/323,729, filed on Apr. 13, 2010.

(51) Int. Cl.
*G06F 12/08*      (2006.01)
*G06F 12/02*      (2006.01)
*G06F 12/10*      (2006.01)

(52) U.S. Cl.
CPC ........ *G06F 12/0835* (2013.01); *G06F 12/0831* (2013.01); *G06F 12/1045* (2013.01)

(58) Field of Classification Search
None
See application file for complete search history.

(56) References Cited

U.S. PATENT DOCUMENTS

| | | | |
|---|---|---|---|
| 6,094,203 A * | 7/2000 | Desormeaux | 345/501 |
| 6,243,791 B1 | 6/2001 | Vondran, Jr. | |
| 6,535,208 B1 | 3/2003 | Saltchev et al. | |
| 6,624,816 B1 | 9/2003 | Jones, Jr. | |
| 7,302,528 B2 | 11/2007 | Cabot et al. | |
| 7,577,792 B2 | 8/2009 | Hady et al. | |
| 7,805,575 B1 | 9/2010 | Agarwal et al. | |
| 2004/0111563 A1 | 6/2004 | Edirisooriya et al. | |
| 2005/0012749 A1 | 1/2005 | Gonzalez et al. | |
| 2006/0007203 A1 | 1/2006 | Chen et al. | |
| 2006/0080513 A1* | 4/2006 | Beukema et al. | 711/141 |
| 2006/0098022 A1 | 5/2006 | Andrews et al. | |
| 2007/0226424 A1* | 9/2007 | Clark et al. | 711/141 |
| 2008/0030509 A1 | 2/2008 | Conroy et al. | |
| 2009/0248983 A1* | 10/2009 | Offen et al. | 711/122 |
| 2010/0037024 A1* | 2/2010 | Brewer et al. | 711/127 |
| 2010/0118041 A1* | 5/2010 | Chen et al. | 345/542 |
| 2011/0161620 A1* | 6/2011 | Kaminski et al. | 711/207 |

OTHER PUBLICATIONS

Cantin, et al.; "Coarse-Grain Coherence Tracking: RegentScout and Region Coherenace Arrays," IEEE Micro, Jan.-Feb. 2006, pp. 70-79.

* cited by examiner

*Primary Examiner* — Charles Rones
*Assistant Examiner* — Tian-Pong Chang
(74) *Attorney, Agent, or Firm* — Meyertons, Hood, Kivlin, Kowert & Goetzel, P.C.

(57) ABSTRACT

Systems, methods, and devices for maintaining cache coherence between two or more heterogeneous processors are provided. In accordance with one embodiment, such an electronic device may include memory, a first processing unit having a first characteristic memory usage rate, and a second processing unit having a second characteristic memory usage rate lower than the first. The first and second processing units may share at least a portion of the memory and one or both of the first and second processing units may maintain internal cache coherence at a first granularity, while maintaining cache coherence between the first processing unit and the second processing unit at a second granularity. The first granularity may be finer than the second granularity.

24 Claims, 7 Drawing Sheets

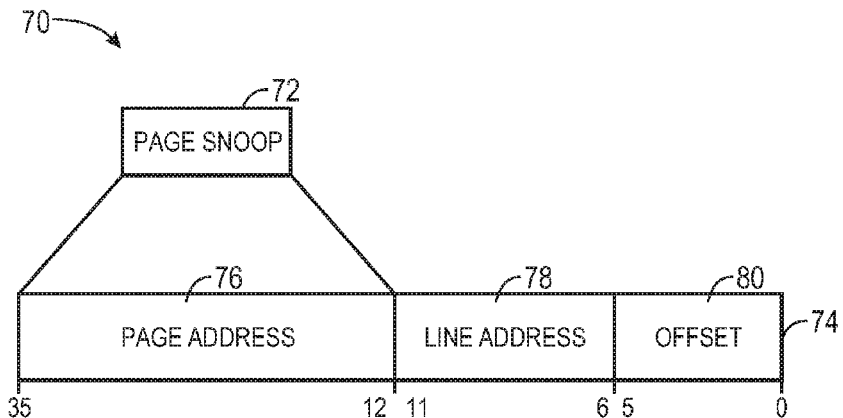
FIG. 5
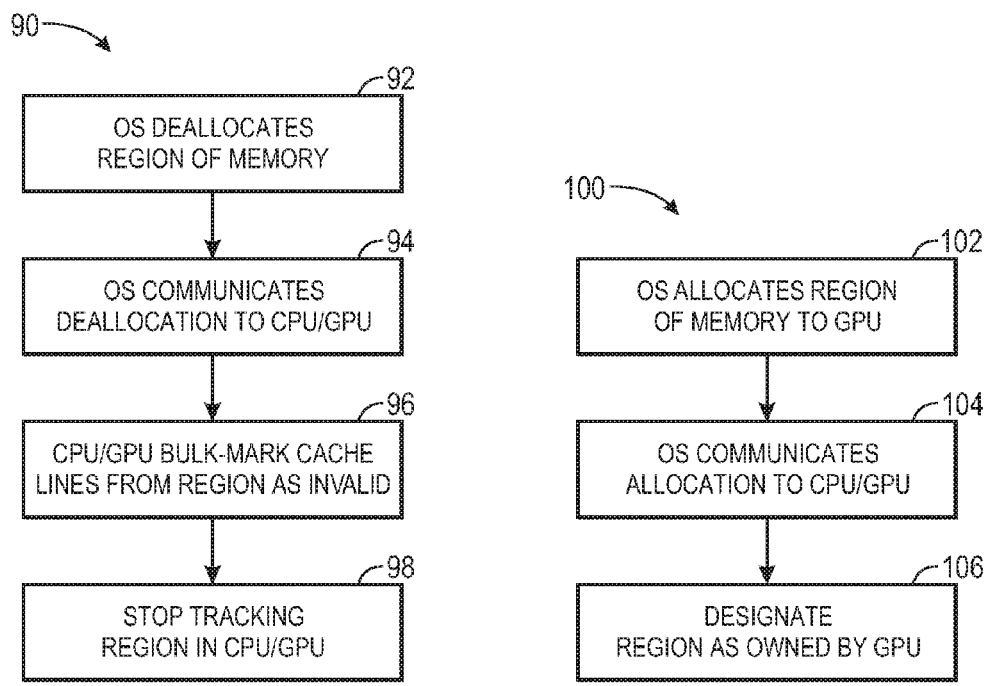
FIG. 6
FIG. 7

COHERENT MEMORY SCHEME FOR HETEROGENEOUS PROCESSORS

CROSS-REFERENCE TO RELATED APPLICATIONS

This application claims benefit of Provisional Application Ser. No. 61/323,729, filed Apr. 13, 2010, entitled "COHERENT MEMORY SCHEME FOR HETEROGENEOUS PROCESSORS," which is incorporated by reference herein in its entirety.

BACKGROUND

The present disclosure relates generally to cache coherence and, more particularly, to cache coherence between heterogeneous processors.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Multi-processor systems frequently employ cache coherence techniques to maintain the integrity of memory shared by the processors. Common cache coherence techniques may involve bus snooping, in which the processors may broadcast memory references to each other before accessing memory potentially in use by another processor. Although these cache coherence techniques may produce acceptable results with small numbers of homogenous processors with the same or similar processing capabilities and/or characteristic memory usage rates, when applied to heterogeneous processors with different processing capabilities and/or characteristic memory usage rates, excessive snoop traffic may result. Indeed, using such current techniques with a central processing unit (CPU) and a graphics processing unit (GPU), snoop traffic may bottleneck performance by consuming significant amounts of inter-processor communication bandwidth.

Alternative techniques have been developed to in an attempt to achieve memory coherence between heterogeneous processors. These techniques may involve designating exclusive pools of memory at the application level, which may result in effective cache coherence only if applications conform to such techniques. However, to employ these techniques, the applications may be required to "know" which pools of memory are allocated to which device. Since these techniques may require dramatic changes to the manner in which applications are currently written, it is unlikely that application developers will write software that efficiently maintains cache coherence according to these techniques.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for maintaining cache coherence between two or more heterogeneous processors. In accordance with one embodiment, such an electronic device may include memory, a first processing unit having a first characteristic memory usage rate, and a second processing unit having a second characteristic memory usage rate lower than the first. The first and second processing units may share at least a portion of the memory and one or both of the first and second processing units may maintain internal cache coherence at a first granularity, while maintaining cache coherence between the first processing unit and the second processing unit at a second granularity. The first granularity may be finer than the second granularity.

BRIEF DESCRIPTION OF THE DRAWINGS

Various aspects of this disclosure may be better understood upon reading the following detailed description and upon reference to the drawings in which:

FIG. 5 is a schematic block diagram illustrating a page-level bus snooping process, in accordance with an embodiment;

FIGS. 6-8 are flowcharts describing embodiments of methods for modifying the cache coherence component of FIG. 4;

DETAILED DESCRIPTION OF SPECIFIC EMBODIMENTS

Figure 1:
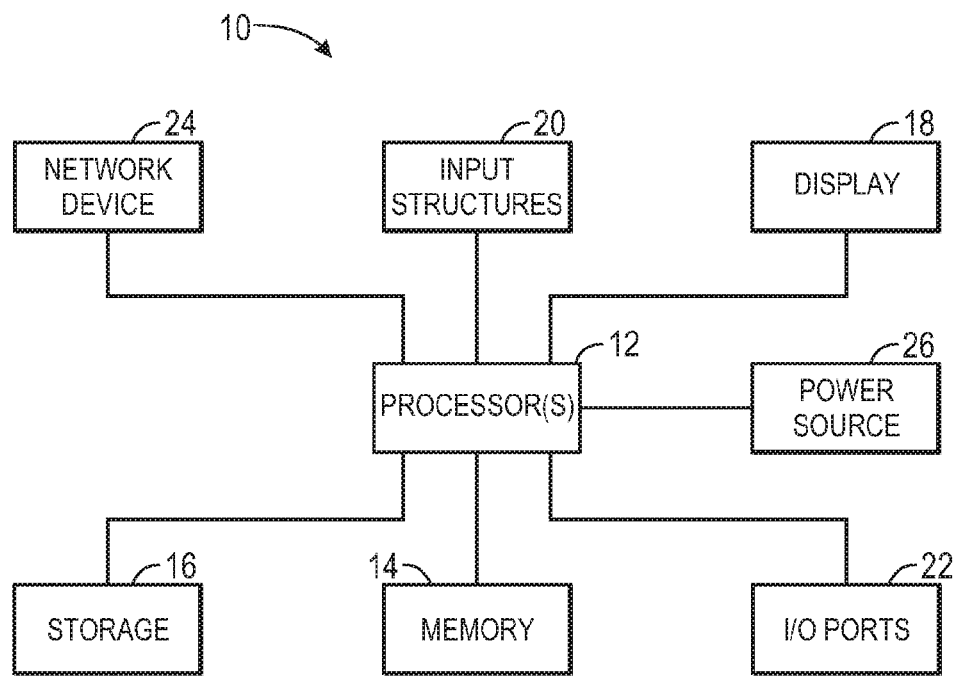
FIG. 1 is a block diagram of a system capable of maintaining cache coherence between two heterogeneous processors, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to maintaining cache coherence between two or more heterogeneous processors, such as a central processing unit (CPU) and a graphics processing unit (GPU). Such processors may be understood to be heterogeneous because each may have a distinct "characteristic memory usage rate," or typical rate of memory consumption during normal operation. For example, one of the processors may use memory at a relatively high bandwidth (e.g., 100 GB/second) or may be a streaming processor or network controller. Although the present disclosure provides various examples of the present techniques using a CPU and a GPU to represent heterogeneous processors, it should be understood that any other suitable devices may be used (e.g., streaming processors, network controllers, and so forth).

The present techniques for cache coherence between heterogeneous processors may be employed not at the application level, but rather at the hardware level and/or operating system level. Moreover, in some embodiments, cache coherence within the CPU may take place at a first, lower granularity (e.g., by memory line), while cache coherence between the CPU and GPU may take place at a second, higher granularity (e.g., by memory region, such as a page). In some embodiments, at least one of the processors may be capable of being halted by the operating system when certain memory is not immediately available to that process. In this way, processors that operate on a large quantity of memory at one time, such as a GPU, may operate with smaller quantities of memory, pausing when memory that is to be operated on is in use by another processor and/or is not yet available for other reasons (e.g., the data is passing through the input/output (I/O) as the GPU is operating on the same memory).

Some embodiments of the present disclosure maintain cache coherence between two or more heterogeneous processors using memory-region-level monitoring hardware, in which it may be understood that a "memory region" is a group of memory larger than a single cache line (e.g., two cache lines, a page, etc.). In particular, in certain embodiments, a CPU and a GPU that share memory may include hardware for monitoring external, inter-processor memory requests at a larger granularity than internal, intra-processor memory requests. It should be noted that, as used herein, the term "inter-processor" refers to interactions between heterogeneous processors (e.g., between a CPU and GPU), and the term "intra-processor" refers to interactions internal to one processor or between homogenous processors (e.g., among processor cores in one CPU or between two CPUs). In this way, the CPU or CPUs may maintain internal, intra-processor cache coherence at a memory line granularity, while maintaining external, inter-processor cache coherence at a memory region granularity. In some embodiments, the GPU may maintain internal cache coherence at the region-level granularity. Since the GPU may request significantly more memory than the CPU, this asymmetric cache coherence scheme may significantly reduce snoop traffic between the CPU and GPU. Since systems that employ integrated graphics processing may especially rely on shared memory, such integrated systems may particularly benefit from these disclosed techniques.

Thus, if the CPU requests a line of memory not found in its local cache, in an event termed a "cache miss," the CPU may gain access to the version of the line of memory shared by the GPU after following certain region-level cache coherence procedures. In particular, if the CPU determines that a region of memory to which the line belongs is not owned by the GPU, the CPU may carry out internal cache coherence without broadcasting any snoop requests to the GPU. If the CPU determines that the region of memory is owned by the GPU, or if the CPU is not aware whether the region of memory is owned by the GPU, the CPU may broadcast a snoop request to the GPU to receive confirmation the region of memory is not in use before accessing the line of memory within the region. Similarly, when a cache miss occurs in the GPU for a line of memory, the GPU may broadcast a snoop request to the CPU for the entire region of memory to which the line of memory belongs if the GPU does not have ownership of the region.

Additionally or alternatively, in some embodiments, when the CPU seeks access to a cache line in a region owned by the GPU, a memory management unit (MMU) of the CPU may generate a page fault exception. The operating system may handle the page fault exception by halting the CPU and allowing the GPU to continue access to the memory until a threshold amount of time passes and/or unless the operating system determines that the priority should fall to the CPU. Thereafter, the operating system may reset the flag bits of the region held by the GPU and may release the CPU to attempt memory access once again.

Figure 2:
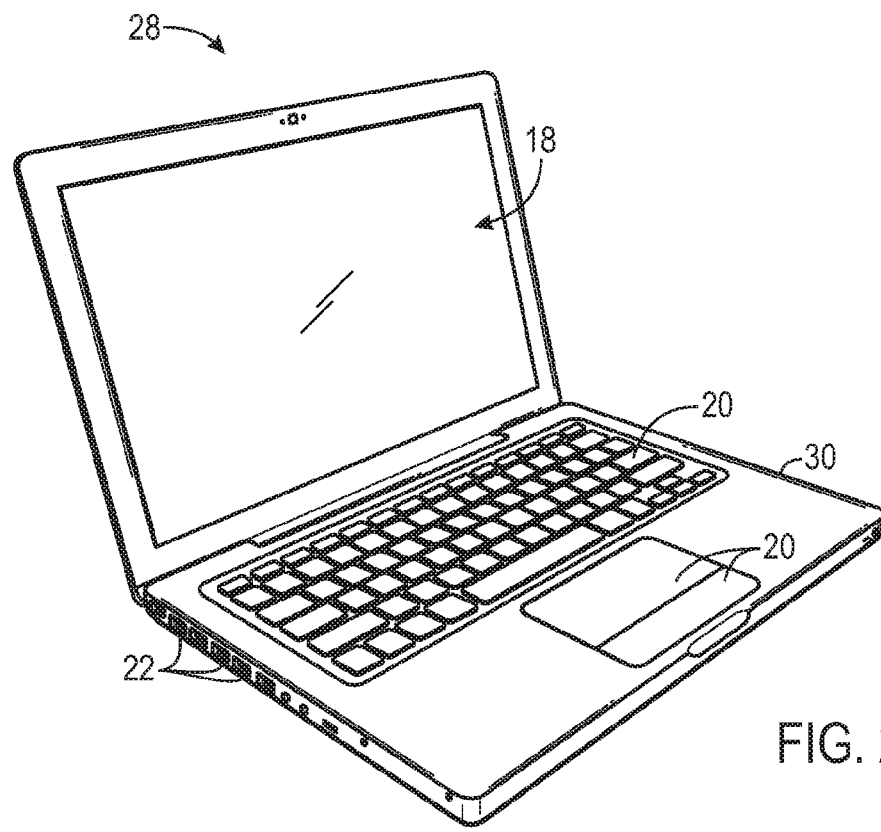
FIG. 2 is a perspective view of a notebook computer implementing the system of FIG. 1, in accordance with an embodiment.

With the foregoing in mind, a general description of suitable electronic devices capable of employing the disclosed memory coherence techniques is provided below. In FIG. 1, a block diagram depicting various components that may be present in electronic devices suitable for use with the present techniques is provided. In FIG. 2, one example of a suitable electronic device, here provided as a notebook computer system, is depicted. These types of electronic devices, and other electronic devices having comparable memory management capabilities, may be used in conjunction with the present techniques.

FIG. 1 is a block diagram illustrating various components and features of an electronic device 10 capable of performing the techniques disclosed herein. In the presently illustrated embodiment, such components may include two or more processors 12, memory 14, nonvolatile storage 16, a display 18, input structures 20, input/output (I/O) ports 22, a networking device 24, and a power source 26.

Figure 14:
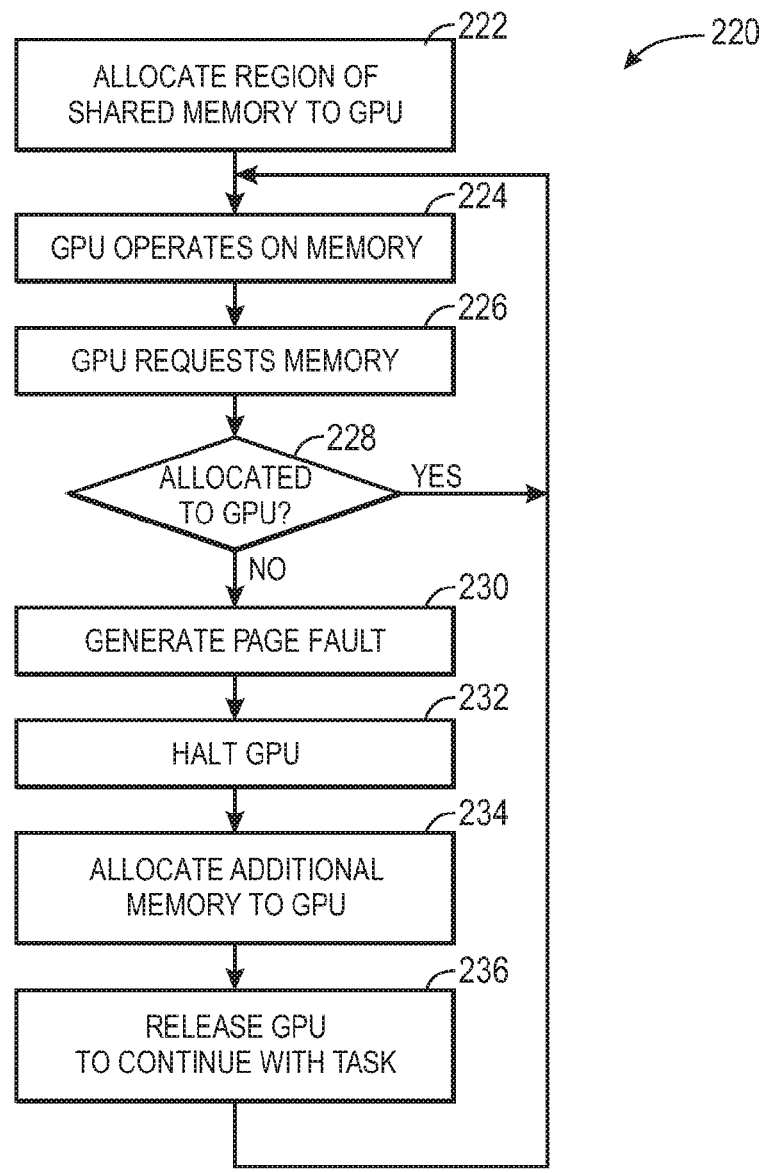
FIG. 14 is a flowchart describing an embodiment of a method for maintaining cache coherence based on virtual memory.

The processors 12 may include at least two processors of heterogeneous capabilities. By way of example, one of the processors 12 may be a central processing unit (CPU) with a relatively low characteristic memory usage rate and/or bandwidth, and another of the processors 12 may be a graphics processing unit (GPU) with a relatively higher characteristic memory usage rate and/or bandwidth. Although the present disclosure provides various examples of the present techniques using a CPU and a GPU to represent heterogeneous processors, it should be understood that any other suitable devices may be used (e.g., streaming processors, network controllers, and so forth). In the example of FIG. 1, at least one of the processors 12 may enable the operation of an operating system (OS), which may allocate virtual memory resources to software running on the OS. The virtual memory may correspond to actual hardware locations in the memory 14 and/or nonvolatile storage 16. The OS running on the processors 12 may also perform certain techniques for maintaining memory coherence for memory resources shared between the processors 12, as described below with reference to FIG. 14. Additionally or alternatively, one or more memory management units (MMUs) of the processors 12 may coordinate inter-processor communication to efficiently maintain cache coherence between the heterogeneous processors.

The memory 14 may store instructions for carrying out certain aspects of the present techniques described herein. These instructions may be stored, at least temporarily, in the memory 14. Such instructions may also be stored in the nonvolatile storage 16, which may include, for example, a hard disk drive or Flash memory. The display 18 may display elements of the OS or software, such as the user interface (UI) of the electronic device 10. A user may interact with the electronic device 10 via the input structures 20, which may include a keyboard and/or a mouse or touchpad. In certain embodiments, the display 18 may be a touchscreen display that serves as one of the input structures 20.

The I/O ports 22 of the electronic device 10 may enable the electronic device 10 to transmit data to and receive data from other electronic devices 10 and/or various peripheral devices, such as external keyboards or mice. The networking device 24 may enable personal area network (PAN) integration (e.g., Bluetooth), local area network (LAN) integration (e.g., Wi-Fi), and/or wide area network (WAN) integration (e.g., 3G). The power source 26 of the electronic device 10 may be any suitable source of power, such as a rechargeable lithium polymer (Li-poly) battery and/or alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 28, is illustrated in FIG. 2 in accordance with one embodiment of the present disclosure. The depicted computer 28 may include a housing 30, a display 18, input structures 20, and I/O ports 22. In one embodiment, the input structures 20 (such as a keyboard and/or touchpad) may be used to interact with the computer 28, such as to start, control, or operate a GUI or applications running on computer 28. For example, a keyboard and/or touchpad may allow a user to navigate a user interface or application interface displayed on display 10.

Figure 3:
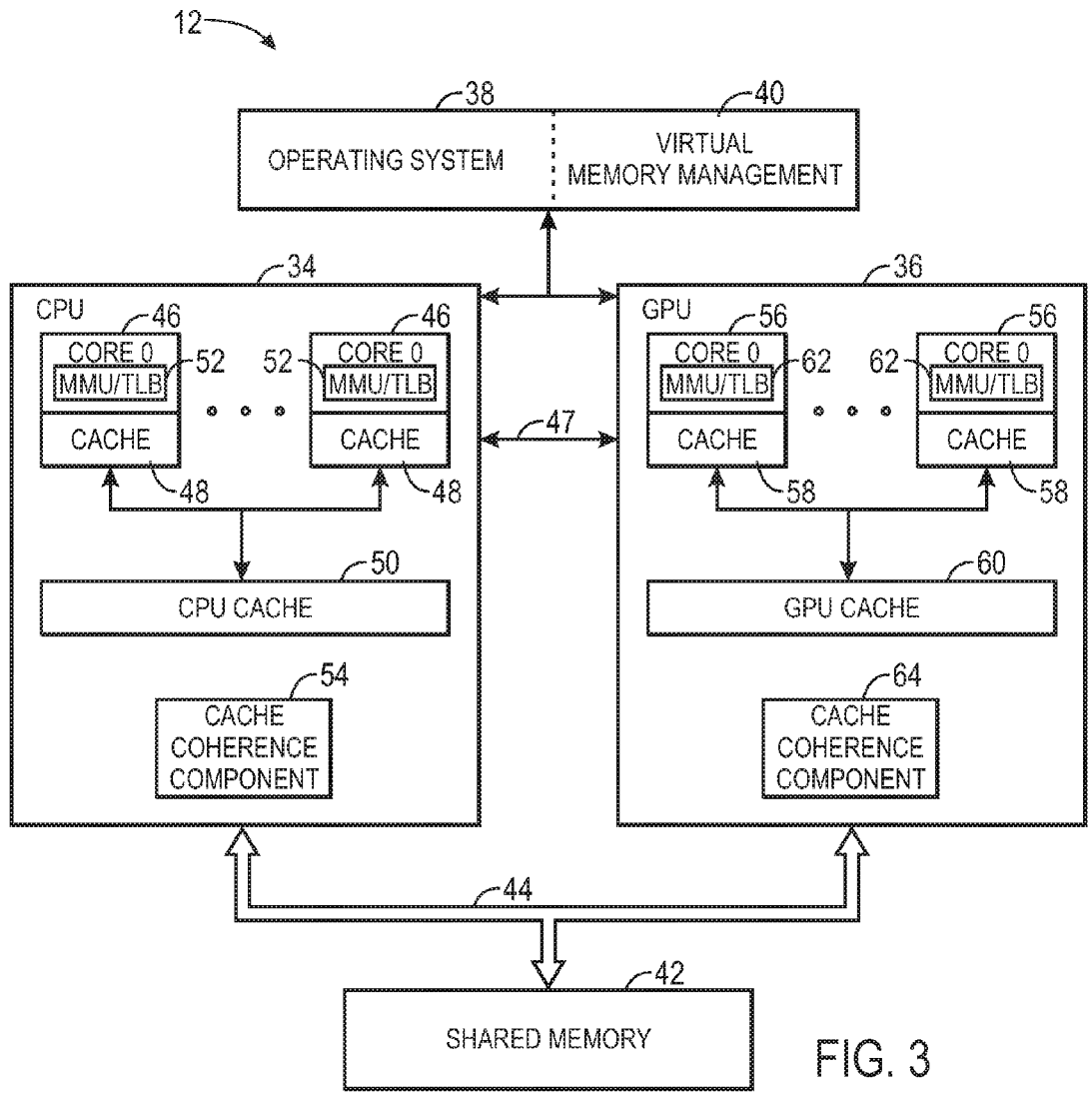
FIG. 3 is a block diagram of two heterogeneous processors, a central processing unit (CPU) and a graphics processing unit (GPU), capable of maintaining cache coherence, in accordance with an embodiment.

In the system described above with reference to FIGS. 1 and 2, the processors 12 may maintain cache coherence despite that at least two of the processors 12 may have heterogeneous memory usage and/or bandwidth capabilities. For example, as illustrated in FIG. 3, the processors 12 may include at least one central processing unit (CPU) 34 and at least one graphics processing unit (GPU) 36. At any given time, the CPU 34 may generally operate on significantly smaller chunks of memory than the GPU 36. An operating system (OS) 38 may run on the CPU 34 and interact with both the CPU 34 and GPU 36 via an operating system kernel and/or drivers. Various processes and/or applications may run on the OS 38. As such, the OS 38 may allocate and deallocate memory for such processes and/or applications via a virtual memory management component 40. Using techniques discussed below with reference to FIG. 14, the virtual memory management component 40 of the OS 38 may allocate memory to the processes and/or applications performing tasks on the CPU 34 or GPU 36 in a manner that maintains memory coherence at the operating system level.

The CPU 34 and the GPU 36 may have access to the same shared memory 42, which may represent a subset of the memory 14, via one or more memory buses 44. In addition or alternatively to maintaining cache coherence by way of the virtual memory management component 40 of the OS 38, the CPU 34 and GPU 36 may do so in hardware. In particular, the CPU 34 and the GPU 36 may communicate inter-heterogeneous-processor snoop requests to one another via the one or more buses 44 and/or via one or more hardware interconnects 47. As will be discussed below, the CPU 34 and GPU 36 may only communicate inter-heterogeneous-processor snoop requests to one another at a relatively large granularity, while a relatively small granularity may be employed for internal cache coherence within the CPU 34 or between several CPUs 34 and/or within the GPU 36.

As illustrated in FIG. 3, the CPU 34 may include any suitable number of processor cores 46, illustrated as 0 to N, each of which may include a low-level cache 48. A CPU-level cache 50 may be shared by all of the processor cores 46. In certain embodiments, the CPU 34 may include only the low-level caches 48 or the CPU-level cache 50. The processor cores 46 may also include a memory management unit and/or a translation look aside buffer (MMU/TLB) component 52. The TLB of the MMU/TLB 52 may translate virtual memory addresses of virtual memory allocated by the virtual memory management component 40 of the OS 38 into physical addresses employed by the caches 48 and 50 and the shared memory 42. When a processor core 46 seeks access to a cache line of memory not present in the cache 48 and/or 50, the MMU of the MMU/TLB may attempt to load the cache line from shared memory 42. Internally, the hardware for the processor cores 46 may provide memory coherence at a first granularity (e.g., a cache line granularity) according to any suitable cache coherence protocol (e.g., MSI, MESI, MOSI, MOESI, etc.).

To ensure that cache coherence is maintained the CPU 34 and the GPU 36, an inter-processor cache coherence component 54 may track the memory ownership of the GPU 36 at a region-level granularity, as discussed further below. This inter-processor cache coherence component 54 may be understood to represent, in some embodiments, a "memory management unit" or a component of the MMU/TLB 52. In alternative embodiments, the CPU 34 may track the memory ownership of the GPU 36 at a region-level granularity using other techniques, such as duplicate line filtering or other snoop filtering techniques. For example, when the CPU 34 or GPU 36 become aware that the GPU 36 owns a region of memory, the CPU 34 or GPU 36 may mark all lines of the region as owned by the GPU 36. Thereafter, if any line in the region is indicated as owned by the GPU 36, all other lines in the region may also be understood to be owned by the GPU 36.

Although the CPU 34 and/or the GPU 36 may maintain internal cache coherence at a fine granularity (e.g., by cache line), the CPU 34 and/or GPU 36 may employ other, coarser grained (e.g., by page) cache coherence techniques to maintain internal cache coherence. For example, in certain embodiments, the CPU 34 and/or GPU 36 may maintain internal cache coherence based on regions of memory of a first size (e.g., by page), while maintaining external cache coherence between one another based on regions of memory of a larger size (e.g., by several pages). Moreover, although the embodiment of FIG. 3 depicts a single CPU 34 and single GPU 36, the present techniques may be employed by a system having any suitable number of CPUs 34 and GPUs 36. In particular, in some embodiments, multiple CPUs 34 may maintain inter-CPU cache coherence at a relatively finer-grained cache coherence (e.g., by cache line), while the multiple CPUs 34 may maintain inter-heterogeneous-processor cache coherence with the GPUs 36 at a relatively coarser-grained cache coherence (e.g., by page).

Like the CPU 34, the GPU 36 may similarly include N processor cores 56, each of which may or may not have a low-level cache 58 and an MMU/TLB 62. The processor cores 56 may share a GPU-level cache 60. In certain embodiments, the GPU 36 may include only the low-level caches 58 or the GPU-level cache 60. The internal memory coherence hardware for the processor cores 56 may provide memory coherence at a cache line granularity according to any suitable cache coherence protocol (e.g., MSI, MESI, MOSI, MOESI, etc.). The GPU 36 may also include an inter-processor cache coherence component 64 to track the current ownership status of certain regions of the shared memory 42. In alternative embodiments, only the inter-processor cache coherence component 54 or 64 may be present. In other embodiments, the CPU 34 and GPU 36 may both rely on a single inter-processor cache coherence component shared by both the CPU 34 and the GPU 36. Certain embodiments may not include any inter-processor cache coherence components, but the CPU 34 and/or GPU 36 may employ alternative manners of tracking whether regions of memory are currently in use by other heterogeneous processors. For example, when the CPU 34 or GPU 36 become aware that the GPU 36 owns a region of memory, the CPU 34 or GPU 36 may mark all lines of the region as owned by the GPU 36. Thereafter, if any line in the region is indicated as owned by the GPU 36, all other lines in the region may also be understood to be owned by the GPU 36.

Figure 4:
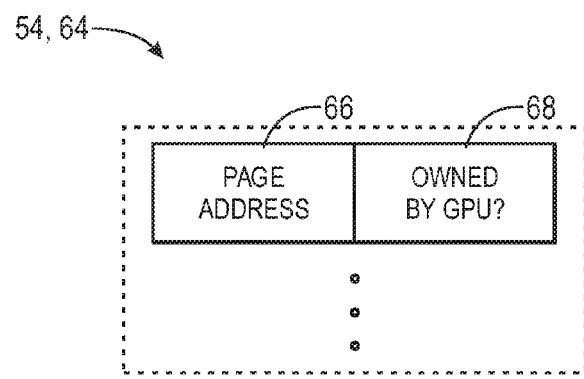
FIG. 4 is a block diagram of a cache coherence component for maintaining cache coherence between heterogeneous processors, in accordance with an embodiment.

As mentioned above, the inter-processor cache coherence component 54 and/or 64 may track the ownership status of certain regions of memory by the GPU 36. FIG. 4 illustrates one embodiment of the inter-processor cache coherence component 54 and/or 64, which includes a memory region status table. In the embodiment illustrated in FIG. 4, the regions of memory tracked by the inter-processor cache coherence component 54 and/or 64 are pages of memory. However, in alternative embodiments, the inter-processor cache coherence component 54 and/or 64 may track GPU 36 memory ownership at any suitable region of memory (e.g., by groupings of several cache lines or several pages, etc.). The inter-processor cache coherence component 54 and/or 64 may include a series of table entries having page address bits 66, which may represent the physical address of a tracked page of memory, and a status bit 68, which may indicate whether the listed page is currently owned by the GPU 36. If the inter-processor cache coherence component 54 and/or 64 tracks a larger or smaller region of memory, the page address bits 66 may include more or fewer bits, as appropriate.

The inter-processor cache coherence component 54 and/or 64 may or may not track all pages of the shared memory 42, and may track only a subset of the pages of the shared memory 42. By way of example, the inter-processor cache coherence component 54 and/or 64 may track only pages that hold cache lines currently stored in the GPU caches 58 and/or 60 or may track a certain number of recently-used pages. For example, the inter-processor cache coherence component 54 and/or 64 may track the same number of pages as the translation lookaside buffer (TLB) of the MMU/TLB components 52 and/or 62, and may employ the same replacement policy. In some embodiments, the inter-processor cache coherence component 54 and/or 64 may be incorporated into one or all of the MMU/TLBs 52 and/or 62. Thus, the inter-processor cache coherence component 54 and/or 64 may maintain only the most relevant entries by, for example, aging out the least recently used (LRU) table entry. In alternative embodiments, the inter-processor cache coherence component 54 and/or 64 may track only those pages currently owned by the GPU 36 or currently known not to be owned by the GPU 36. For such embodiments, the status bit 68 may be absent because memory ownership, or the lack thereof, may be implied by the presence of the page address bits 66.

The inter-processor cache coherence component 54 and/or 64 may set or reset the status bit 68 to indicate whether the GPU 36 currently owns the associated page of memory, after the associated MMU/TLB 52 and/or 62 determines that the GPU 36 has taken or relinquished ownership of a page of memory. Thus, depending on the configuration of the processors 12, the inter-processor cache coherence component 54 and/or 64 may be updated when a snoop request is issued or responded to regarding a page of memory.

Since the snoop requests broadcast between the CPU 34 and the GPU 36 may take place at a memory region (e.g., page) granularity, rather than a memory line granularity, the hardware interconnect 47 and/or other snoop request monitoring hardware may take up less space, as fewer bits may be snooped. A schematic block diagram of an embodiment of such page-level snooping circuitry 70 appears in FIG. 5, but it should be appreciated that other embodiments of such snooping circuitry may snoop memory regions of other granularities (e.g., half of a page, a quarter of a page, a few cache lines, etc.). With the page-level snooping circuitry 70, a page snoop 72 may take place over a reduced number of bits of a cache tag 74, which may represent the cache line being requested on the memory bus 44 or via the hardware interconnect 47. As such, the cache tag 74 may include 36 bits, including page address bits 76 (bits 12-35), line address bits 78 (bits 6-11), and offset bits 80 (bits 0-5). The page snoop 72 may only involve snooping page address bits 76 of the cache tag 74, rather than snooping both the page address bits 76 and line address bits 78. In this manner, snoop requests between the GPU 36 and CPU 34 may involve a reduced amount of snoop hardware. Moreover, it should be understood that the snooping circuitry schematically illustrated in FIG. 5 may snoop more or fewer bits of the cache tag 74 if the memory region granularity is smaller or larger than one page.

Figure 8:
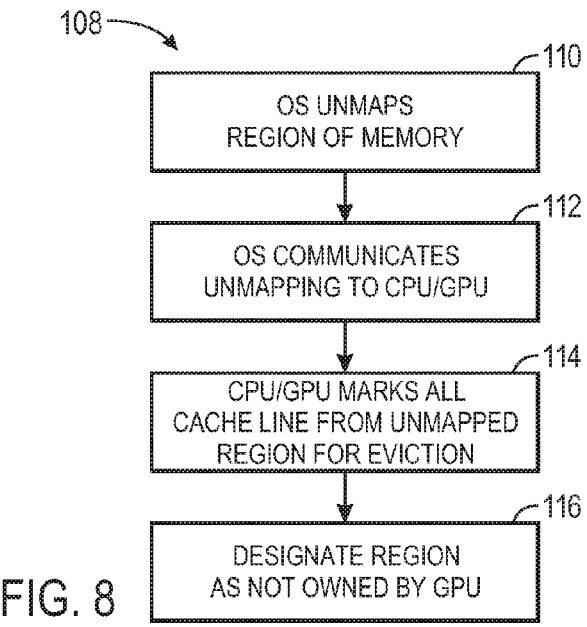

When the MMU/TLBs 52 and/or 62 of the CPU 34 and/or GPU 36 include the inter-processor cache coherence components 54 and/or 64, the inter-processor cache coherence components 54 and/or 64 may be updated when the virtual memory management component 40 of the OS 38 takes certain action, as illustrated by FIGS. 6-8. In particular, a flowchart 90 illustrated in FIG. 6 provides an embodiment of a method for hardware cache memory management when the virtual memory management component 40 of the OS 38 deallocates a region of memory, such as a page of memory. The flowchart 90 may begin with block 92, when the virtual memory management component 40 of the OS 38 deallocates a region of memory. In block 94, the OS 38 may communicate the event to the CPU 34 and/or GPU 36. Because the region of memory has been deallocated, cache lines from the deallocated region may no longer be valid. Thus, in block 96, depending on the cache coherence protocol (e.g., MSI, MESI, etc.), the caches 48, 50, 58, and/or 60 may mark as invalid all cache lines associated with the deallocated region. Further, in block 98, the inter-processor cache coherence components 54 and/or 64 may stop tracking the deallocated region address.

Turning to FIG. 7, a flowchart 100 describes an embodiment of a method for hardware cache memory management when the virtual memory management component 40 of the OS 38 allocates a region of memory, such as a page of memory, to the GPU 36. The flowchart 100 may begin with block 102, when the virtual memory management component 40 of the OS 38 allocates a region of memory to the GPU 36. In block 104, the OS 38 may communicate the event to CPU 34 and/or GPU 36. In block 106, the inter-processor cache coherence components 54 and/or 64 may designate the newly allocated region address as owned by the GPU 36. Alternatively, the inter-processor cache coherence components 54 and/or 64 may begin tracking the newly allocated region address.

Additionally, a flowchart 108 of FIG. 8 describes a manner of hardware cache memory management when the virtual memory management component 40 of the OS 38 unmaps a region of memory, such as a page of memory. The flowchart 108 may begin with block 110, when the virtual memory management component 40 of the OS 38 unmaps a page of memory (i.e., when the page of memory is no longer mapped). In block 112, the OS 38 may communicate the event to the CPU 34 and/or GPU 36. Because the page of memory has been unmapped, cache lines from the unmapped page may no longer be of use. Thus, in block 114, the caches 48, 50, 58, and/or 60 may evict or mark for eviction all cache lines associated with the unmapped page. Further, in block 116, the inter-processor cache coherence components 54 and/or 64 may designate the unmapped region address as not owned by the GPU 36. Alternatively, in block 116, the inter-processor cache coherence components 54 and/or 64 may stop tracking the unmapped page address.

Figure 9:
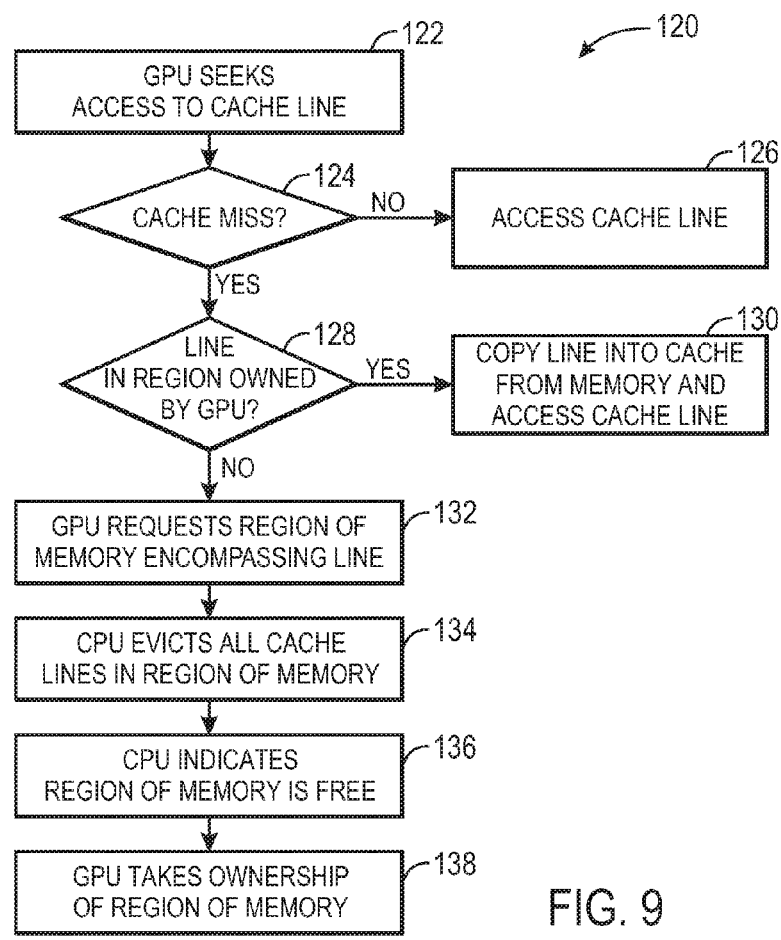
FIG. 9 is a flowchart describing an embodiment of a method for maintaining cache coherence between a CPU and a GPU when the GPU seeks access to a cache line.

Based on the inter-processor cache coherence component 54 and/or 64, or based on other manners of determining whether the GPU 36 currently owns a region of memory, the GPU 36 and CPU 34 may access cache lines without issuing an excessive number of inter-processor snoop requests. A flowchart 120, illustrated in FIG. 9, describes an embodiment of a method for gaining access to a cache line from the GPU 36. In a first block 122, the GPU 36 may seek access a cache line to perform an operation on data stored in the cache line. If, as indicated by a decision block 124, the cache line is present in the cache 58 and/or 60, in an event termed a "cache hit," the GPU 36 may follow a cache coherence protocol, such as MSI, MESI, MOSI, MOESI, etc., in handling the cache line of memory based on a cache line status. For example, each cache line in the caches 58 and/or 60 may include a cache line status encoded with the cache line, which may indicate a state of the cache line in accordance with the cache coherence protocol. By way of example, the cache coherence protocol may be a form of MESI, and the cache line status encoded with each line may be two or more bits that signify whether the cache line is modified, exclusive, shared, or invalid. Based on the state of the cache line, the GPU 36 may access the cache line from the cache 58 and/or 60 with or without internal communications, with or without first writing the cache line into the shared memory 42, and/or with or without first reading the cache line from the shared memory 42.

If the cache line is not present in the cache 58 and/or 60, in an event termed a "cache miss," an MMU/TLB 62 of the GPU 36 may determine whether the desired cache line belongs to a region currently owned by the GPU 36 in a decision block 128. The MMU/TLB 62 may determine whether the GPU 36 currently owns the cache line by way of the cache coherence component 64. If, as indicated by the decision block 128, the cache line is located in a region owned by the GPU 36, the MMU/TLB 62 may load the requested line from the shared memory 42, where the requesting processor core 56 may thereafter access the cache line, without broadcasting a snoop request from the GPU 36 to the CPU 34.

If the cache line is not located in a region owned by the GPU 36, or if the GPU 36 is unable to determine whether the cache line is located in a region owned by the GPU 36, the process may flow to block 132. In block 132, the MMU/TLB 62 or the cache coherence component 64 of the GPU 36 may broadcast a snoop request to the MMU/TLB 52 or the cache coherence component 54 of the CPU 34 over the interconnect 47 and/or the memory bus 44. Rather than simply requesting the cache line to which the processor core 58 had sought access, the snoop request broadcast by the MMU/TLB 62 or the cache coherence component 64 to the MMU/TLB 52 or the cache coherence component 54 may request an entire region of memory (e.g., page of memory) to which the cache line belongs. Thus, in block 134, the MMU/TLB 52 or the cache coherence component 54 of the CPU 34 may cause all cache lines currently stored in the caches 48 and/or 50 associated with the requested region of memory to be evicted. In block 136, the MMU/TLB 52 or the cache coherence component 54 may broadcast an indication to the MMU/TLB 62 or the cache coherence component 64 that the region of memory requested by the GPU 36 is now free for operation. Also in block 136, the MMU/TLB 52 or the cache coherence component 54 may update the inter-processor cache coherence component 54 to indicate that the GPU 36 now owns that region of memory. Thereafter, in block 138, the GPU 36 may take ownership of the region of memory requested in block 132. Moreover, the inter-processor cache coherence component 64 may be updated to reflect the ownership of the region of memory by the GPU 36.

Figure 10:
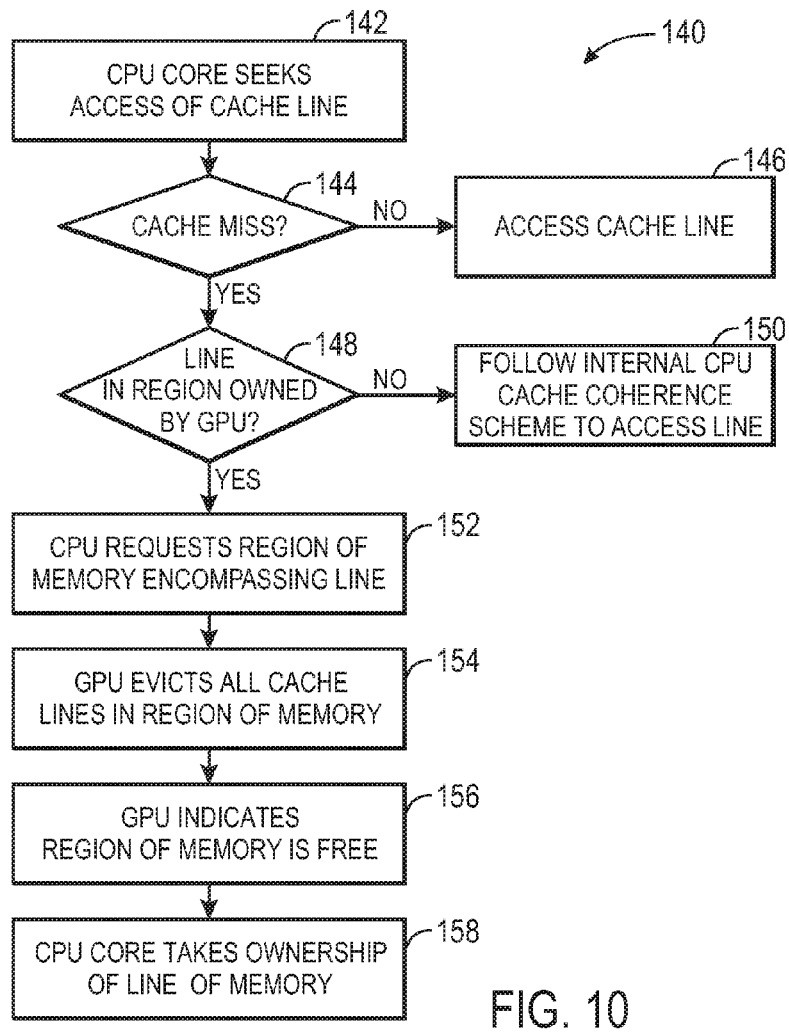
FIGS. 10-13 are flowcharts describing embodiments of methods for maintaining cache coherence between a CPU and a GPU when the CPU seeks access to a cache line.

The CPU 34 also may maintain cache coherence while reducing the amount of inter-processor snoop traffic in a variety of manners, which are described in greater detail with reference to FIGS. 10-13. Turning first to FIG. 10, a flowchart 140 represents one embodiment of a method to maintain such cache coherence when, as shown in block 142, a processor core 46 of the CPU 34 seeks to access a cache line of memory. If, as indicated by a decision block 144, the cache line sought by the processor core 46 is present in the cache 48 and/or 50, resulting in a cache hit, the processor core 46 may follow a cache coherence protocol, such as MSI, MESI, MOSI, MOESI, etc., in handling the cache line of memory based on a cache line status in block 146.

If the cache line is not present in the cache 48 and/or 50, a cache miss may occur. If so, as indicated by a decision block 148, the MMU/TLB 52 or the cache coherence component 54 of the CPU 34 may determine whether the cache line is located in a region owned by the GPU 36. If the line is not in a region owned by the GPU 36, the CPU 36 may follow internal cache coherence protocols to access the cache line. The internal cache coherence protocol may be different from the protocol employed between the CPU 34 and the GPU 36, in that the cache coherence protocol may employ a lower-level granularity (e.g., line-level granularity) internally or between itself and another CPU 34.

If the cache line is determined to be in a region owned by the GPU 36, or if the CPU 34 is unable to determine whether the region is owned by the GPU 36, the MMU/TLB 52 or the cache coherence component 54 of the CPU 34 may issue a snoop request to the MMU/TLB 62 or the cache coherence component 64 of the GPU 36. Rather than simply requesting the cache line to which the processor core 58 had sought access, the snoop request broadcast by the MMU/TLB 52 or the cache coherence component 54 to the MMU/TLB 62 or the cache coherence component 64 may request an entire region of memory (e.g., a page of memory) to which the cache line belongs. In block 154, the MMU/TLB 62 or the cache coherence component 64 may cause all cache lines belonging to the region of memory requested by the CPU 34 to be evicted from the caches 58 and/or 60. The MMU/TLB 62 or the cache coherence component 64 of the GPU 36 may thereafter indicate to the MMU/TLB 52 or the cache coherence component 54 of the CPU 34 that the requested region of memory is now free and is no longer owned by the GPU 36 in block 156. Additionally, the cache coherence component 64 of the GPU 36 may be updated to indicate that the GPU 36 no longer owns this region of memory. Finally, in block 158, the CPU 34 may take ownership of the line of memory. If the CPU 34 includes the inter-processor cache coherence component 54, the CPU 34 may update the inter-processor cache coherence component 54 to indicate that the GPU 36 no longer owns the requested region.

Figure 11:
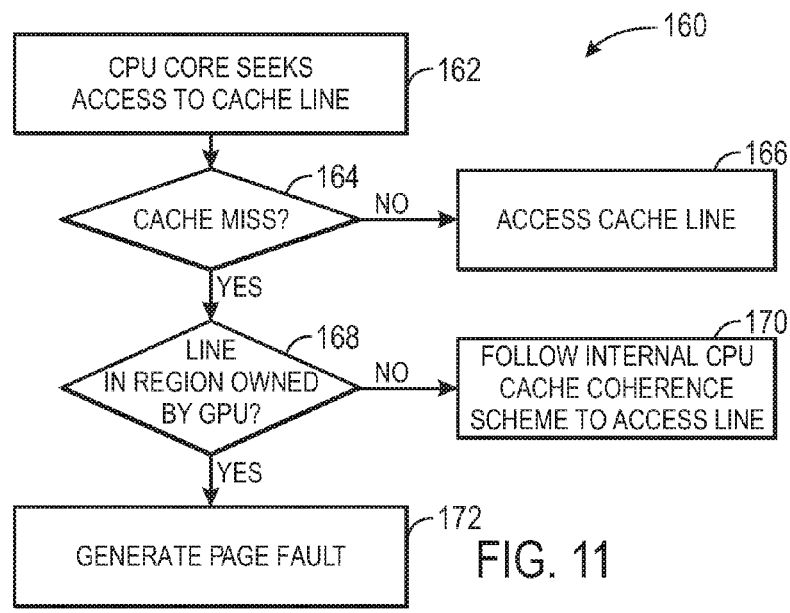
Figure 12:
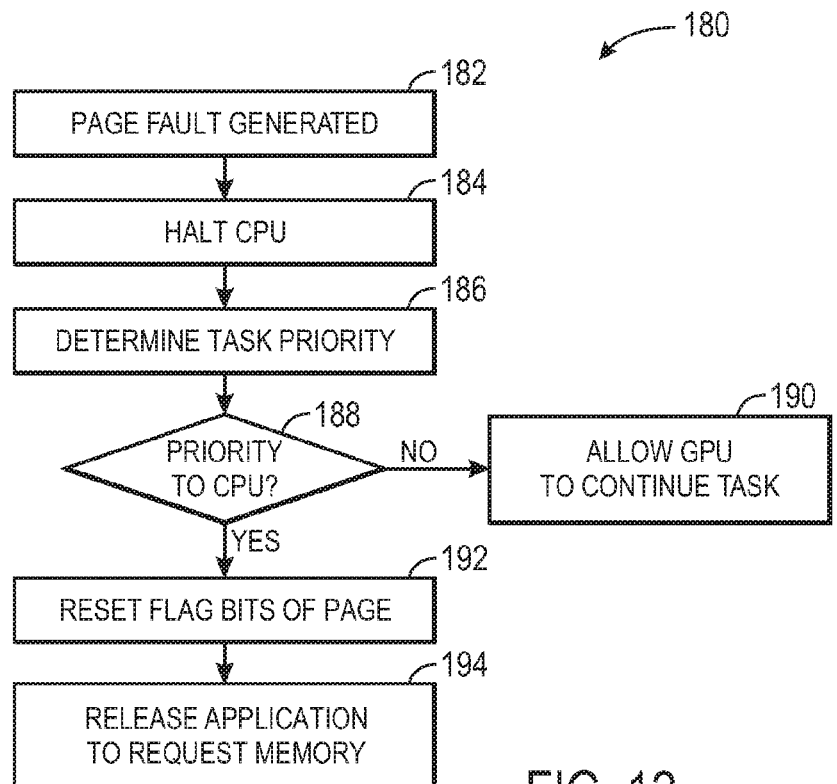
Figure 13:
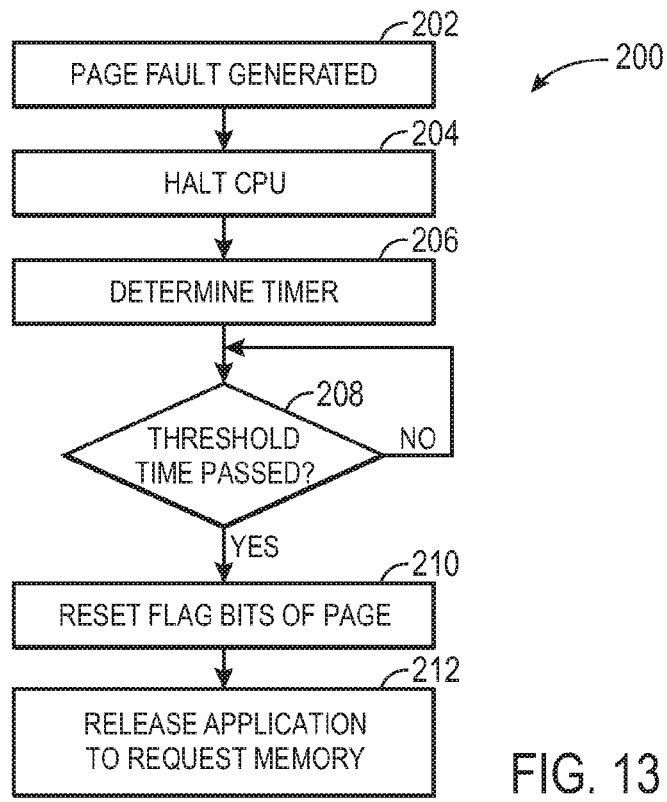

A flowchart 160 of FIG. 11, in concert with flowcharts of FIGS. 12 and 13, describes other embodiments of methods for maintaining cache coherence when the CPU 34 seeks to access a cache line of memory (e.g., when an application running on the CPU 34 seeks access to the cache line). Blocks 162-170 of the flowchart 160 may take place in substantially the same manner as blocks 142-150 of the flowchart 140. However, block 172 may differ from block 152. If the cache line is determined to be located in a region of memory owned by the GPU 36, or if the CPU 34 is unable to determine whether the region of memory is owned by the GPU 36, the CPU 34 may not issue a snoop request to the GPU 36. Instead, in block 172, the MMU/TLB 52 or the cache coherence component 54 of the CPU 34 may generate a page fault exception for the OS 38 to handle.

The OS 38 may handle such a page fault exception in a variety of ways. For example, the OS 38 may allow access to the region of memory based on which of the processors 12 should have priority, as shown in FIG. 12, and/or based on a threshold amount of time, as shown in FIG. 13. Turning first to FIG. 12, a flowchart 180 may begin with block 182, in which the OS 38 may receive the page fault exception, generated in block 172 of FIG. 11, from the MMU/TLB 52 or the cache coherence component 54. In response, a paging supervisor component of the OS 38 may halt the operation of the CPU 34 that caused the page fault exception in block 184. In block 186, the OS 38 may determine whether the task being undertaken in the GPU 36 or the task that was attempted by the CPU 34 should have priority.

As indicated by a decision block 188, if the task being undertaken in the GPU 36 is determined to have priority over the task attempted by the CPU 34, in block 190, the OS 38 may not change the ownership of the region of memory from the GPU 36, allowing the GPU 36 to continue to operate while the operation of the CPU 34 has been halted or redirected. If the task attempted by the CPU 34 is determined to have priority over the task being undertaken in the GPU 36, the OS 38 may take blocks to transfer the ownership of the region of memory from the GPU 36 to the CPU 34 in blocks 192 and 194. In particular, in block 192, the OS 38 may reset the flag bits of the region of memory (e.g., the page), causing the region of memory to be recognizable by the MMU/TLB 52 or the cache coherence component 54 as not shared by any other processors 12, thereby effectively transferring ownership of the region of memory. Additionally or alternatively, the OS 38 may instruct the inter-processor cache coherence components 54 and/or 64 to indicate that the GPU 36 no longer owns the region of memory. Thereafter, in block 194, the OS 38 may release the task of the CPU 34 to request the line of memory once again.

FIG. 13 represents an alternative embodiment, in which the OS 38 may handle the page fault exception of block 172 by allowing a certain amount of time to pass before transferring the region of memory from the GPU 36 to the CPU 34. In particular, a flowchart 200 representing such an embodiment may begin with block 202, in which the OS 38 may receive the page fault exception from the MMU/TLB 52 or the cache coherence component 54. In response, in block 204, a paging supervisor component of the OS 38 may halt the task of the CPU 34 that caused the page fault exception. In block 206, the OS 38 may denote the current time or the time when the page fault exception was generated. Thereafter, as indicated by decision block 208, the CPU 34 may remain halted or may be redirected until a threshold amount of time has passed. After the threshold amount of time has passed, the OS 38 may take blocks to transfer the ownership of the region of memory from the GPU 36 to the CPU 34. In particular, in block 210, the OS 38 may reset the flag bits of the region of memory (e.g., the page), causing the region of memory to be recognizable by the MMU/TLB 52 or the cache coherence component 54 as not shared by any other processors 12, thereby effectively transferring ownership of the region of memory. Additionally or alternatively, the OS 38 may instruct the inter-processor cache coherence components 54 and/or 64 to indicate that the GPU 36 no longer owns the region of memory. Thereafter, in block 212, the OS 38 may release the task of the CPU 34 to request the line of memory once again.

While the techniques discussed above with reference to FIGS. 9-13 relate to maintaining cache coherence between heterogeneous processors at the hardware level, the virtual memory management component 40 of the OS 38 may, additionally or alternatively, undertake certain cache coherence measures by efficiently allocating virtual memory. A flowchart 220 of FIG. 14 describes an embodiment of one such method. In a first block 222, the virtual memory management component 40 may allocate a quantity of virtual memory to the GPU 36. The virtual memory allocated to the GPU 36 may, in some embodiments, correspond to relatively large, contiguous chunks of the shared memory 42 (e.g., entire pages), rather than relatively small contiguous chunks of the shared memory 42 (e.g., one or more lines of memory).

In block 224, the GPU 36 may operate on lines of memory in the virtual memory allocated to it by the virtual memory management component 40 until, as indicated by block 226, a task of the GPU 36 causes the GPU 36 to request additional lines of memory. As shown in decision block 228, if the requested memory is currently allocated to the GPU 36, the process may return to block 224 and the GPU 36 may operate on the memory. If the requested memory is not currently allocated to the GPU 36, rather than, or in addition to, broadcasting a region-level snoop request to the CPU 36, the MMU/TLB 62 of the GPU 36 may generate a page fault exception for the OS 38 to handle. The GPU 36 may halt or switch tasks or, additionally or alternatively, when the OS 38 receives the page fault exception, the OS 38 may halt the GPU 36 in block 232. In block 234, the virtual memory management component 40 may allocate additional virtual memory to the GPU 36, before releasing the GPU 36 to continue with its task in block 236. Thereafter, the process may return to block 224 and the GPU 36 may operate on the memory.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
   memory capable of being shared between two processing units;
   a first processing unit having a first characteristic memory usage rate; and
   a second processing unit having a second characteristic memory usage rate, wherein the second characteristic memory usage rate is lower than the first characteristic memory usage rate; and
   wherein the first processing unit and the second processing unit are configured to share at least a portion of the memory and wherein the first processing unit or the second processing unit, or a combination thereof, is configured to maintain internal cache coherence at a first granularity and to maintain cache coherence between the first processing unit and the second processing unit at a second granularity, wherein the first granularity is finer than the second granularity; and wherein the second processing unit is further configured to:
generate a page fault exception responsive to the second processing unit requesting access to a memory region owned by the first processing unit;
denote the time the page fault exception occurs;
halt execution of the second processing unit for a threshold amount of time, dependent upon the denoted time;
resume processing of the second processing unit in response to the threshold amount of time elapsing; and
transfer ownership of the memory region to the second processing unit.

2. The electronic device of claim 1, wherein the first processing unit or the second processing unit comprises a central processing unit, a graphics processing unit, a streaming processor, or a network controller, or a combination thereof.

3. The electronic device of claim 1, wherein the first processing unit and the second processing unit are configured to communicate memory requests to one another at the second granularity.

4. The electronic device of claim 1, wherein the first granularity is a memory line granularity.

5. The electronic device of claim 1, wherein the second granularity is a memory page granularity.

6. An electronic device comprising:
a memory configured to store data from at least two processing units;
a graphics processing unit having a first characteristic memory usage rate, wherein the graphics processing unit is configured to:
access a portion of the memory; and
halt processing in response to receiving a halt instruction; and
a central processing unit having a second characteristic memory usage rate, wherein the second characteristic memory usage rate is lower than the first characteristic memory usage rate wherein the central processing unit is configured to:
share the portion of the memory with the graphics processing unit; and
run an operating system, wherein the operating system is configured to maintain memory coherence between the central processing unit and the graphics processing unit by instructing the graphics processing unit to halt responsive to a request by the graphics processing unit for memory not allocated to the graphics processing unit.

7. The electronic device of claim 6, wherein the graphics processing unit includes a memory management unit configured to generate a page fault exception when the graphics processing unit requests memory not allocated to the graphics processing unit and wherein the operating system is configured to handle the page fault exception at least in part by halting the graphics processing unit.

8. The electronic device of claim 6, wherein the operating system is configured to allocate additional memory to the graphics processing unit after instructing the graphics processing unit to halt and to instruct or configure the graphics processing unit to continue processing after the additional memory has been allocated to the graphics processing unit.

9. The electronic device of claim 6, wherein the operating system is configured to allocate virtual memory to the graphics processing unit in coarser granularities than memory lines.

10. A method comprising:
upon a cache miss of a line of memory in a cache of a graphics processing unit:
determining if a region of memory shared between the graphics processing unit and a central processing unit in which the line of memory is located, is owned by the graphics processing unit based at least in part on whether another line of memory in the region of memory is owned by the graphics processing unit;
generating a page fault exception, by the graphics processing unit, to the central processing unit responsive to the determination the line of memory is not owned by the graphics processing unit;
instructing, by the central processing unit, the graphics processing unit to halt, responsive to the page fault exception;
allocating, by the central processing unit, additional memory to the graphics processing unit; and
releasing, by the central processing unit, the graphics processing unit to continue processing.

11. The method of claim 10, further comprising receiving, from the central processing unit to the graphics processing unit, an indication that the region of memory is not in use by the central processing unit before accessing the line of memory.

12. The method of claim 10, further comprising following an internal cache coherence protocol in the graphics processing unit with cache line granularity before accessing the line of memory.

13. The method of claim 10, wherein determining if the region of memory is owned by the graphics processing unit further comprises determining if the region of memory is owned by the graphics processing unit dependent upon, at least in part, on an inter-processor cache coherence component that tracks whether the region of memory is owned by the graphics processing unit.

14. The method of claim 10, further comprising accessing the line of memory in the region of memory without generating the page fault exception when the graphics processing unit determines that the region of memory is owned by the graphics processing unit.

15. A central processing unit comprising:
a local cache configured to store cache lines of memory;
a snoop circuit configured to snoop a subset of address bits of a cache tag broadcast by at least one graphics processing unit;
a processor core configured to request cache lines from the local cache; and
a memory management unit configured, when the processor core requests a cache line not stored in the local cache, to:
retrieve the cache line of memory from memory shared among the central processing unit and other central processing units and the at least one graphics processing unit;
maintain cache coherence between the other central processing units at a memory line-level granularity; and
maintain cache coherence between the central processing unit and the at least one graphics processing unit at a memory region-level granularity; and
generate a page fault exception responsive to the processor core seeking access to a cache line in a region owned by the at least one graphics processing unit; and an operating system configured to:
  denote a time the page fault exception occurs;
  halt the processor core responsive to receiving the page fault exception;
  delay a threshold amount of time, dependent upon the denoted time, wherein the processor core is halted during the delay and the graphics processing unit is active during the delay; and
  release the processor core to attempt the memory access again.

16. The central processing unit of claim 15, wherein the memory management unit comprises an inter-processor cache coherence component configured to indicate whether a memory region with which the cache line is associated is owned by the graphics processing unit.

17. The central processing unit of claim 16, wherein the inter-processor cache coherence component comprises a table, each table entry including a number of page address bits corresponding to a region of memory, wherein, the number of page address bits is determined by the size of the region of memory.

18. The central processing unit of claim 17, wherein each table entry includes a status bit indicating whether the region of memory is owned by the graphics processing unit.

19. The central processing unit of claim 16, comprising a translation lookaside buffer configured to translate between virtual memory page addresses and physical memory page addresses, wherein the inter-processor cache coherence component is configured to indicate whether pages listed in the translation lookaside buffer are owned by the graphics processing unit.

20. The central processing unit of claim 15, wherein the snoop circuit is configured to snoop page address bits of the cache tag.

21. A method comprising:
  upon a cache miss of a line of memory in a cache of a central processing unit, wherein the line of memory is located in a region of memory shared by the central processing unit and a graphics processing unit:
    determining if the region of memory is owned by the graphics processing unit;
    accessing the line of memory according to a cache coherence protocol having a cache line granularity without broadcasting a snoop request for the region of memory to the graphics processing unit dependent upon the determination that the region of memory is not owned by the graphics processing unit;
    generating a page fault exception in the central processing unit dependent upon the determination that the region of memory is owned by the graphics processing unit;
    denoting a time the page fault exception occurs;
    halting the central processing unit responsive to the page fault exception; and
    transferring ownership of the region of memory dependent upon a threshold amount of time elapsing since the page fault exception was generated, dependent upon the denoted time,
  wherein the central processing unit remains halted until the threshold amount of time elapses and the graphics processor remains active while the threshold amount of time elapses.

22. The method of claim 21, comprising, upon the cache miss of the line of memory in the cache of the central processing unit, broadcasting the snoop request for the region of memory to the graphics processing unit before accessing the line of memory, unless the central processing unit determines that the region of memory is not owned by the graphics processing unit.

23. The method of claim 21, wherein transferring ownership of the region after a threshold amount of time has passed since the page fault exception was generated further comprises instructing the central processing unit to access the line of memory using an operating system running on the central processing unit.

24. The method of claim 21 further comprising;
  determining, using an operating system running on the central processing unit, whether the central processing unit or the graphics processing unit has priority in accessing the region of memory; and
  transferring ownership of the region of memory to the central processing unit dependent upon the determination that the central processing unit has priority; and
  instructing the central processing unit to access the line of memory using an operating system running on the central processing unit.

* * * * *

UNITED STATES PATENT AND TRADEMARK OFFICE
CERTIFICATE OF CORRECTION

PATENT NO. : 9,128,849 B2  
APPLICATION NO. : 13/082139  
DATED : September 8, 2015  
INVENTOR(S) : Ian Hendry et al.

Page 1 of 1

It is certified that error appears in the above-identified patent and that said Letters Patent is hereby corrected as shown below:

In the Claims:

Claim 9, Column 14, Line 2, please delete "virtual memory" and substitute -- memory --

Signed and Sealed this
Ninth Day of February, 2016

Michelle K. Lee
*Director of the United States Patent and Trademark Office*